United States Patent
Reddy et al.

(10) Patent No.: US 10,052,585 B2
(45) Date of Patent: Aug. 21, 2018

(54) EMISSIONS REDUCTION FOR $CO_2$ CAPTURE

(71) Applicant: Fluor Technologies Corporation, Aliso Viejo, CA (US)

(72) Inventors: Satish Reddy, Laguna Beach, CA (US); Joseph Yonkoski, Irvine, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 181 days.

(21) Appl. No.: 14/838,948

(22) Filed: Aug. 28, 2015

(65) Prior Publication Data

US 2015/0367283 A1    Dec. 24, 2015

Related U.S. Application Data

(62) Division of application No. 13/851,010, filed on Mar. 26, 2013, now Pat. No. 9,643,125.

(Continued)

(51) Int. Cl.
*B01D 53/79* (2006.01)
*B01D 53/62* (2006.01)
(Continued)

(52) U.S. Cl.
CPC ......... *B01D 53/79* (2013.01); *B01D 53/1475* (2013.01); *B01D 53/32* (2013.01);
(Continued)

(58) Field of Classification Search
CPC .... B01D 53/79; B01D 53/1475; B01D 53/32; B01D 53/323; B01D 53/54; B01D 53/58;
(Continued)

(56) References Cited

U.S. PATENT DOCUMENTS 5,318,758 A    6/1994    Fujii et al.
5,746,984 A    5/1998    Hoard
(Continued)

FOREIGN PATENT DOCUMENTS

CN    201635805    11/2010
CN    102225303    10/2011
(Continued)

OTHER PUBLICATIONS

EP13769954, Extended European Search Report, dated Nov. 19, 2015, 9 pages.
(Continued)

*Primary Examiner* — Xiuyu Tai
(74) *Attorney, Agent, or Firm* — Conley Rose, P.C.

(57) ABSTRACT

Systems and processes for reducing carbon capture emissions are described. The process involves introducing a radical species into a decarbonized combustion gas. The radical species react with residual amines or unwanted compounds in the decarbonized combustion gas, thus reducing the concentration of residual amines or unwanted compounds in the exhaust gas. The system includes a carbon capture absorber with non-thermal plasma generator configured to provide radical species reducing the concentration of residual amines or unwanted compounds in the exhaust combustion gas.

17 Claims, 3 Drawing Sheets

Related U.S. Application Data

(60) Provisional application No. 61/615,428, filed on Mar. 26, 2012.

(51) Int. Cl.

| | | |
|---|---|---|
| *B01D 53/14* | (2006.01) | |
| *B01D 53/32* | (2006.01) | |
| *B01D 53/54* | (2006.01) | |
| *B01D 53/58* | (2006.01) | |
| *B01D 53/72* | (2006.01) | |

(52) U.S. Cl.
CPC ........... *B01D 53/323* (2013.01); *B01D 53/54* (2013.01); *B01D 53/58* (2013.01); *B01D 53/62* (2013.01); *B01D 53/72* (2013.01); *B01D 2252/102* (2013.01); *B01D 2252/204* (2013.01); *B01D 2252/2021* (2013.01); *B01D 2252/20405* (2013.01); *B01D 2252/20447* (2013.01); *B01D 2252/20484* (2013.01); *B01D 2252/20489* (2013.01); *B01D 2257/504* (2013.01); *B01D 2258/0283* (2013.01); *B01D 2259/818* (2013.01); *Y02C 10/04* (2013.01); *Y02C 10/06* (2013.01)

(58) Field of Classification Search
CPC .. B01D 53/62; B01D 53/72; B01D 2252/102; B01D 2252/2021; B01D 2252/204; B01D 2252/20405; B01D 2252/20447; B01D 2252/20484; B01D 2252/20489; B01D 2257/504; B01D 2258/0283; B01D 2259/818; B01D 53/346; B01D 53/38; B01D 2251/104; B01D 2257/708; Y02C 10/04; Y02C 10/06; C10J 3/18; C10J 3/005; C10J 3/723; C10J 2300/1884; C10J 2300/0946; C10J 2300/1223; C10J 2300/1631; C10J 2300/1665; F23G 2201/303; F23G 2201/603; F23G 2203/20; F23G 2204/201; F23G 5/006; F23L 7/00; F23L 2900/07005; F23L 2900/07008; Y02E 20/344; Y02E 50/32

See application file for complete search history.

(56) References Cited

U.S. PATENT DOCUMENTS

| | | | |
|---|---|---|---|
| 6,066,303 | A | 5/2000 | Sudduth et al. |
| 6,089,169 | A * | 7/2000 | Comiskey ............. C10J 3/18 110/185 |
| 6,132,692 | A | 10/2000 | Alix et al. |
| 6,136,158 | A | 10/2000 | Wang et al. |
| 6,348,178 | B1 | 2/2002 | Sudduth et al. |
| 6,605,263 | B2 | 8/2003 | Alis et al. |
| 7,316,737 | B2 | 1/2008 | Mimura et al. |
| 7,713,421 | B2 | 5/2010 | Galbraith |
| 7,767,167 | B2 | 8/2010 | Keras |
| 2002/0014071 | A1 | 2/2002 | Balmer et al. |
| 2003/0077212 | A1 | 4/2003 | Hammer |
| 2008/0289495 | A1 | 11/2008 | Eisenberger et al. |
| 2009/0282977 | A1 | 11/2009 | Koss |
| 2009/0324443 | A1 | 12/2009 | Whitehead et al. |
| 2010/0172793 | A1* | 7/2010 | Obee .................. B01D 53/32 422/3 |
| 2010/0200390 | A1 | 8/2010 | Ikeda et al. |
| 2010/0254868 | A1 | 10/2010 | Obee et al. |
| 2011/0064634 | A1 | 3/2011 | Enos |

FOREIGN PATENT DOCUMENTS

| | | |
|---|---|---|
| CN | 202061136 | 12/2011 |
| EP | 1125704 | 10/2011 |
| JP | 2006247547 A | 9/2006 |
| JP | 201510871 | 4/2010 |
| KR | 2003-0043404 | 6/2003 |
| WO | 2009/091437 | 7/2009 |
| WO | 2011/123301 | 10/2011 |

OTHER PUBLICATIONS

Chen, Z. et al., "Nonthermal Plasma for Gaseous Pollution Control", Industrial & Engineering Chemistry Research, 2002, vol. 41, No. 9, pp. 2082-2089.

US Environmental Protection Agency, "Using Non-Thermal Plasma to Control Air Pollutants", prepared by the Clean Air Technology Center, Feb. 2005.

Patent Cooperation Treaty, KIPO, "Notification of Trasnmiattal of the International Search Report and the Written Opinion of the International Searching Authority, or the Declaration", PCT Application No. PCT/US13/33932, dated Jul. 2, 2013.

EP13769954, Examination Report, dated Jun. 8, 2017, 5 pages.

* cited by examiner

EMISSIONS REDUCTION FOR $CO_2$ CAPTURE

This application is a divisional application of, and claims priority to, U.S. patent application Ser. No. 13/851,010 filed on Mar. 26, 2013, which claims priority to U.S. Provisional Patent Application Ser. No. 61/615,428 filed on Mar. 26, 2012. This and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is emissions reduction for carbon dioxide ($CO_2$) capture processes.

BACKGROUND

The following description includes information that may be useful in understanding the present invention. It is not an admission that any of the information provided herein is prior art or relevant to the presently claimed invention, or that any publication specifically or implicitly referenced is prior art.

Carbon dioxide ($CO_2$) capture processes and technologies are commonly used in fossil fuel-burning plants. The purpose of $CO_2$ capture is to minimize $CO_2$ emissions by capturing/removing $CO_2$ from combustion gas and storing the $CO_2$ for safe disposal or use.

Unfortunately, some $CO_2$ capture technologies produce other unwanted emissions, such as, monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, nitrosamines, and amine degradation products. It has recently been appreciated that some $CO_2$ capture technologies are releasing these unwanted emissions in potentially harmful amounts, it would be advantageous to provide new $CO_2$ capture technologies, systems, and processes that minimize these harmful emissions.

Non-thermal plasma (NTP) technology (also referred to as dielectric barrier discharge, dielectric barrier corona discharge, silent discharge plasma, high energy corona, electron beam plasma corona destruction, electro-catalytic oxidation, and capillary discharge) is currently being studied and developed for removing pollutants from atmospheric emissions. See *"Using Non-Thermal Plasma to Control Air Pollutants,"* by the United States Environmental Protection Agency, February 2005, EPA-456/R-05-001. Simply stated, NTP processes generally comprise introducing a gas into an electrical field that is sufficiently strong to cause molecules in the gas to form highly reactive free radicals (e.g., $O_2$ changes to $O^+$ and $O^+$). The free radicals then react with pollutants to facilitate removal of the pollutants. For example, NTP technology can be used to convert elemental mercury to mercury oxide in order to facilitate mercury removal from combustion gas. It would be advantageous to provide a NIP process capable of reducing harmful emissions created by $CO_2$ capture processes.

Japanese Patent Application Publication JP2010510871T describes a method of reducing volatile organic compounds (VOCs) emissions and halogenated volatile organic compounds (HVOCs) emissions using reactive oxygen species (ROS) produced from a dielectric barrier discharge (DBD) electrode and a non-thermal plasma field. Korean Patent Application Publication KR102003004340 also describes a method of reducing VOC emissions from a combustion gas using NIP technology. Other patent references that apply NTP technology to VOC removal are U.S. Pat. No. 7,767,167 and International Patent Publication No. WO2011/123301.

It has yet to be appreciated that NTP technologies can be used to reduce unwanted emissions produced from $CO_2$ capture processes (e.g., amines, etc).

SUMMARY OF THE INVENTION

The inventive subject matter provides apparatus, systems, and methods in which unwanted compounds produced from carbon capture processes are reduced. In one aspect of some embodiments, a system includes a carbon capture absorber having an inlet and an outlet that define a combustion gas pathway. A combustion gas having high amounts of carbon dioxide flows through the absorber along the pathway. The absorber has an injector configured to inject an amine solvent into the pathway at a first injection point. The amine solvent mixes and reacts with the combustion gas and produces a rich amine solvent and a decarbonized combustion gas. The decarbonized gas contains unwanted compounds, such as monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, nitrosamines, or any amine degradation product. A plasma generator is placed inside the absorber and downstream of the injector. The plasma generator treats the decarbonized combustion gas to produce a plurality of radical species that react with the unwanted compounds, thus reducing the concentration of the unwanted compounds in the exhaust gas (i.e., the gas released into the atmosphere).

In one aspect of some embodiments, the plasma generator comprises a non-thermal plasma generator. In other aspects of some embodiments, the absorber includes a plurality of injectors for injecting the amine solvent. The plasma generator is placed downstream of all the solvent injectors, however, it is also contemplated that some of the injectors could be located downstream of the plasma generator.

In yet other aspects, the unwanted compounds have a concentration of more than fifty parts-per-million just upstream of the plasma generator, and a concentration less than or equal to 1 part-per-million just downstream of the plasma generator. The decrease of concentration is due to destruction of the unwanted compounds and not due to dilution. In other embodiments, the plasma generator is configured to reduce an upstream concentration of about six parts-per-million to a downstream concentration of one part-per-million, more preferably, a half a part-per-million.

In another aspect of some embodiments, the plasma generator is configured to produce very little back pressure (i.e., the pressure difference between just upstream and just downstream of the plasma generator), preferably less than 10 millibars, more preferably less than 5 millibars, more preferably less than 2 millibars. In some embodiments, the plasma generator includes plates that are placed parallel to the decarbonized combustion gas pathway.

In yet another aspect of some embodiments, the plasma generator is a thermal plasma generator. In these embodiments, the power supplied to the thermal plasma generator is preferably adjusted such that substantially no $NO_x$ is produced.

The inventive subject matter also provides systems for reducing unwanted emissions from a carbon capture process, wherein the plasma generator is external to the carbon capture absorber. The carbon capture absorber includes a second injector system for injecting radical species supplied by the plasma generator. In some embodiments, the plasma generator utilizes atmospheric air to provide radical species. The thermal plasma generator is preferably located close to the absorber so that the radical species lifetime inside the absorber is maximized.

Various objects, features, aspects and advantages of the inventive subject matter will become more apparent from the following detailed description of preferred embodiments, along with the accompanying drawing figures in which like numerals represent like components.

DETAILED DESCRIPTION

One should appreciate that the disclosed techniques provide many advantageous technical effects including methods and devices for reducing harmful and/or unwanted emissions from carbon capture processes.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

Figure 1:
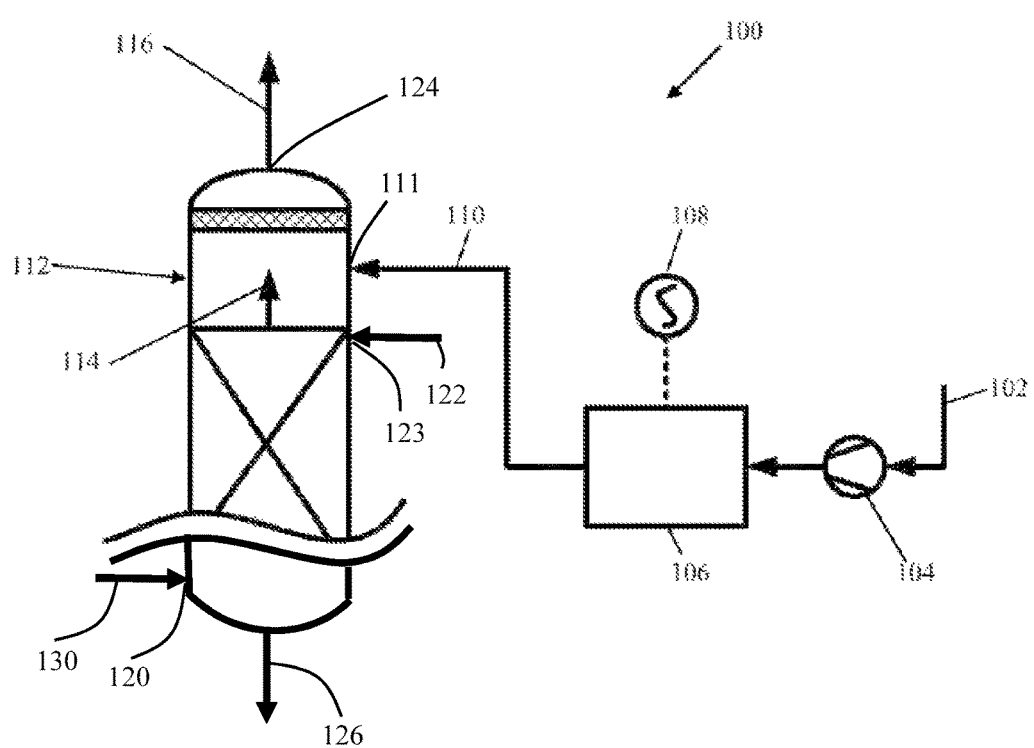
FIG. 1 is a schematic of one embodiment of a system for reducing unwanted carbon capture emissions.

FIG. 1 shows a system 100 for reducing carbon capture emissions. The system includes a carbon capture absorber 112 having an inlet 120 for a combustion gas 130 and an outlet 124 for an exhaust gas 116 that define a gas pathway. The combustion gas 130 having high amounts of carbon dioxide flows through the absorber 112 along the pathway. The absorber 112 is configured to inject an amine solvent 122 into the pathway at a first point 123, or example, via an injector. The amine solvent 122 mixes and reacts with the combustion gas 130 and produces a rich amine solvent 126 and a decarbonized combustion gas 114. The decarbonized combustion gas 114 contains unwanted compounds at a first concentration. A non-thermal plasma (NTP) generator 106 is coupled with the absorber 112 and configured to provide a plurality of radical species contained in a ionized gas 110 that feeds to the absorber 112 at a second point 111. At least a subset of the radical species contained in the ionized gas 110 reacts with at least a subset of the unwanted compounds in the decarbonized combustion as 114 to thereby reduce the first concentration of unwanted compounds in the decarbonized combustion gas 114 to a second concentration of unwanted compounds in the exhaust gas 116. To produce the radical species, atmospheric air 102 is drawn into blower 104 and pushed into the NTP generator 106. Power source 108 produces an electrical field within NTP generator 106. As atmospheric air 102 passes through the electrical field, molecules become excited and form high-energy, ionized gas molecules including oxygen, hydroxyl, and peroxyl radicals. High-energy ionized gas 110 is sent to absorber 112 at the second point 111 of the absorber 112 and mixes with decarbonized combustion gas 114 to produce exhaust gas 116 having the unwanted compounds at the second concentration before gas 114 is vented to the atmosphere. Exhaust gas 116 flows from the absorber 112 via the outlet 124. Gas 110 contains molecules with the ability to oxidize, react with, and/or combust unwanted compounds or impurities in decarbonized combustion gas 114. These unwanted compounds or impurities may include residual amines or other unwanted compounds produced from a carbon capture process (e.g. monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, nitrosamines, and amine degradation products).

System 100 advantageously reduces unwanted emissions produced from carbon capture processes. For example, exhaust gas 116 has a concentration of residual amines or other unwanted compounds that is substantially lower than the concentration in decarbonized combustion gas 114. This reduction in the concentration of residual amines or other unwanted compounds is due to the destruction of the compounds and not due to dilution.

Figure 2:
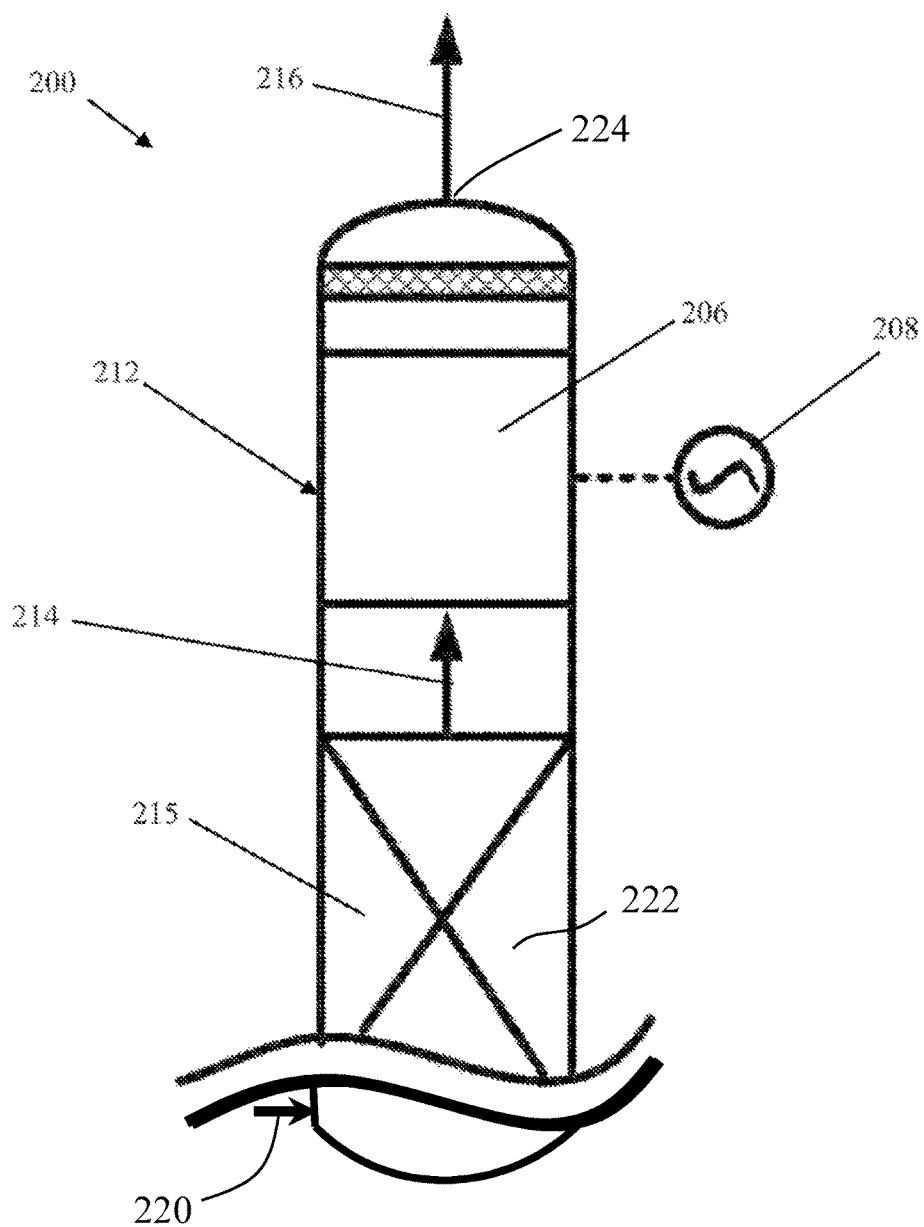
FIG. 2 is another embodiment of a system for reducing unwanted carbon capture emissions.

FIG. 2 shows a system 200 for reducing carbon capture emissions. Absorber 212 receives a combustion gas at an inlet 220 just upstream of carbon capture process 215. Carbon capture processes are well known and generally comprise injecting an amine solvent 222 into the flow pathway of a combustion gas. Water-washing the decarbonized gas is also well known to those familiar with the art and may be included in process 215. Process 215 produces decarbonized combustion gas 214 and a rich amine solvent (not shown). Gas 214 contains residual amines or other unwanted compounds (e.g., amines that were not used during the carbon capture process or amine degradation products). Gas 214 then flows through NTP generator 212. Power source 208 produces an electrical field within NIP generator 206, producing a high-energize ionized gas within generator 206. Radical species formed within generator 212 react with residual amines or unwanted compounds to reduce the concentration of residual amines or unwanted compounds in exhaust gas 216 passim through the outlet 224.

Figure 3:
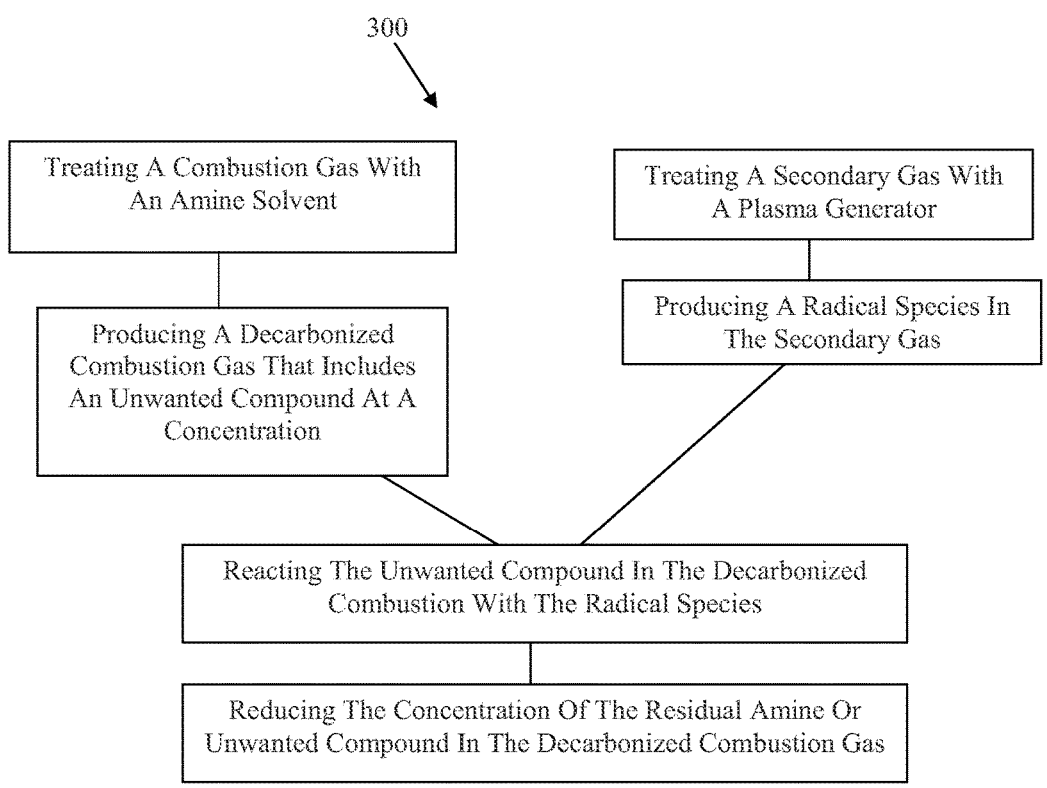
FIG. 3 is a schematic of a method of reducing unwanted carbon capture emissions.

FIG. 3 shows a schematic of a method 300 for reducing carbon capture emissions. Method 300 comprises: (i) treating a combustion gas with an amine solvent to thereby produce a rich amine solvent and a decarbonized combustion gas that includes an unwanted compound at a concentration; (ii) treating at least a portion of a secondary gas with a plasma generator to thereby produce a radical species in the secondary gas; and (iii) reacting the unwanted compound in the decarbonized combustion with the radical species to thereby reduce the concentration of the unwanted compound in the decarbonized combustion gas.

While the figures show NTP generators for producing radical species, it is also contemplated that thermal plasma generators could be used.

The methods and systems described herein provide numerous advantages. Current carbon capture absorbers can be retrofitted with the plasma generators described herein without the need to increase the absorber height. Furthermore, contemplated systems reduce the concentration of unwanted compounds to acceptable levels without introducing signification back pressure. In addition, contemplated systems produce little-to-no $NO_x$.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The recitation of ranges of values herein is merely intended to serve as a shorthand method of referring individually to each separate value filling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A system for reducing unwanted emissions from a carbon capture process, comprising:
   an absorber having an inlet for a combustion gas and an outlet for an exhaust gas that define a gas pathway, wherein the absorber is configured to receive the combustion gas at the inlet and to receive an amine solvent at a first point of the absorber; and
   a non-thermal plasma generator coupled with the absorber and configured to provide a plurality of radical species at a second point of the absorber;
   wherein the absorber is further configured to remove carbon dioxide from the combustion as to produce a rich amine solvent and a decarbonized combustion gas, wherein the absorber produces the decarbonized combustion gas at or downstream of the first point, wherein the decarbonized combustion gas comprises a plurality of unwanted compounds at a first concentration; and
   wherein the absorber is further configured to receive the plurality of radical species into the pathway at the second point such that at least a subset of the plurality of radical species reacts with at least a subset of the plurality of unwanted compounds to thereby reduce the first concentration of the plurality of unwanted compounds in the decarbonized combustion gas to a second concentration of the plurality of unwanted compounds in the exhaust gas,
   wherein the second point is between the first point and the outlet.

2. The system of claim 1, further comprising a power source that is configured to produce an electric field within the non-thermal plasma generator.

3. The system of claim 2, wherein the non-thermal plasma generator is located outside of the absorber.

4. The system of claim 3, wherein the non-thermal plasma generator has an atmospheric air inlet for producing the plurality of radical species from atmospheric air.

5. The system of claim 4, further comprising a blower that is configured to push air into the atmospheric air inlet.

6. The system of claim 1, wherein an unwanted compound of the plurality of unwanted compounds is selected from the group consisting of monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, and nitrosamines.

7. The system of claim 1, wherein an unwanted compound of the plurality of unwanted compounds comprises an amine degradation product.

8. The system of claim 1, wherein the first concentration is greater than or equal to fifty parts-per-million and the second concentration is less than or equal to 1 part-per-million.

9. The system of claim 1, wherein the absorber is configured to receive the combustion gas into the pathway via the inlet.

10. A method for reducing unwanted emissions from a carbon capture process, comprising:
    receiving a combustion gas into a pathway within an absorber, wherein the absorber has an inlet for the combustion gas and an outlet for an exhaust gas that define the pathway, and wherein the absorber comprises an amine solvent configured to remove carbon dioxide from the combustion gas to produce a decarbonized combustion gas and a rich amine solvent;
    receiving the amine solvent at a first point of the absorber, wherein the absorber is further configured to produce the decarbonized combustion gas at or downstream of the first point, wherein the decarbonized combustion gas comprises a plurality of unwanted compounds at a first concentration;
    providing a plurality of radical species at a second point of the absorber using a non-thermal plasma generator, wherein the non-thermal plasma generator is coupled with the absorber; and receiving, by the absorber, the plurality of radical species into the pathway at the second point;

reacting at least a subset of the radical species with at least a subset of the plurality of unwanted compounds; and reducing the first concentration of the plurality of unwanted compounds in the decarbonized combustion gas to a second concentration in an exhaust gas based on the reacting, wherein the second point is between the first point and the outlet.

11. The method of claim 10, further comprising producing an electric field within the non-thermal plasma generator.

12. The method of claim 11, wherein the non-thermal plasma generator is located outside of the absorber.

13. The method of claim 12, wherein the non-thermal plasma generator has an atmospheric air inlet for producing the plurality of radical species from atmospheric air.

14. The method of claim 13, further comprising pushing air into the atmospheric air inlet.

15. The method of claim 10, wherein an unwanted compound of the plurality of unwanted compounds is selected from the group consisting of monoethanolamine (MEA), diethanolamine (DEA), methyldiethanolamine (MDEA), piperazine, diglycolamine (DGA), 2-Amino-2-methyl-1-propanol (2-AMP), methylamines, formaldehyde, acetaldehyde, methanol, ammonia, and nitrosamines.

16. The method of claim 10, wherein the unwanted compound of the plurality of unwanted compounds comprises an amine degradation product.

17. The method of claim 10, wherein the first concentration is greater than or equal to fifty parts-per-million and the second concentration is less than or equal to 1 part-per-million.

* * * * *

UNITED STATES PATENT AND TRADEMARK OFFICE
CERTIFICATE OF CORRECTION

PATENT NO.         : 10,052,585 B2                                    Page 1 of 1
APPLICATION NO.    : 14/838948
DATED              : August 21, 2018
INVENTOR(S)        : Satish Reddy et al.

It is certified that error appears in the above-identified patent and that said Letters Patent is hereby corrected as shown below:

In the Specification

Column 4, Line 46, replace "passim" with ---passing---

Signed and Sealed this
Fifth Day of March, 2019

Andrei Iancu
*Director of the United States Patent and Trademark Office*